(12) United States Patent  
Hautson et al.

(10) Patent No.: US 10,095,325 B2
(45) Date of Patent: Oct. 9, 2018

(54) METHOD FOR LOCATING AT LEAST ONE MOVABLE MAGNETIC OBJECT AND ASSOCIATED SYSTEM

(71) Applicant: ISKN, Saint Martin D'Heres (FR)

(72) Inventors: Tristan Hautson, Fontaine (FR); Rabeb Aloui, Fontaine (FR)

(73) Assignee: ISKN, Saint Martin D'Heres (FR)

( * ) Notice: Subject to any disclaimer, the term of this patent is extended or adjusted under 35 U.S.C. 154(b) by 0 days.

(21) Appl. No.: 15/534,813

(22) PCT Filed: Dec. 7, 2015

(86) PCT No.: PCT/EP2015/078814
§ 371 (c)(1),
(2) Date: Jun. 9, 2017

(87) PCT Pub. No.: WO2016/091798
PCT Pub. Date: Jun. 16, 2016

(65) Prior Publication Data
US 2017/0336885 A1     Nov. 23, 2017

(30) Foreign Application Priority Data
Dec. 9, 2014   (FR) ..................................... 14 62106

(51) Int. Cl.
G06F 3/0354   (2013.01)
G06F 3/046    (2006.01)
G01V 3/08     (2006.01)

(52) U.S. Cl.
CPC .......... *G06F 3/03545* (2013.01); *G01V 3/081* (2013.01); *G06F 3/046* (2013.01)

(58) Field of Classification Search
None
See application file for complete search history.

(56) References Cited

U.S. PATENT DOCUMENTS

| | | | | |
|---|---|---|---|---|
| 4,870,602 A | * | 9/1989 | Baumker | ............... G01C 17/38 324/245 |
| 5,337,259 A | * | 8/1994 | Breed | .................... G01B 7/004 324/207.13 |
| 5,444,669 A | * | 8/1995 | Polvani | .................. F41G 7/008 114/21.3 |

(Continued)

FOREIGN PATENT DOCUMENTS

FR   2 988 862 A1   10/2013
FR   2 988 872 A1   10/2013

*Primary Examiner* — Patrick Moon
*Assistant Examiner* — Peijie Shen
(74) *Attorney, Agent, or Firm* — Baker & Hostetler LLP

(57) ABSTRACT

A method for locating at least one movable magnetic object with respect to an array of at least N triaxial magnetometers comprises steps consisting in: subtracting a weighted average from each of the measurements to obtain modified measurement; loading the modified measurements and a location of the one or more movable magnetic objects at the current time as input into a filtering operation for locating the one or more movable magnetic objects; implementing the location filtering operation, this comprises steps consisting in: subtracting a weighted average from each of the estimated data; and delivering as output a location of the one or more movable magnetic objects at a subsequent time.

6 Claims, 2 Drawing Sheets

(56) References Cited

U.S. PATENT DOCUMENTS

| | | | | |
|---|---|---|---|---|
| 5,731,996 A * | 3/1998 | Gilbert | ............... | G01V 3/081 |
| | | | | 324/207.13 |
| 5,831,873 A * | 11/1998 | Kohnen | ............... | G01V 3/08 |
| | | | | 702/150 |
| 6,129,668 A * | 10/2000 | Haynor | ............... | A61B 5/06 |
| | | | | 128/899 |
| 6,263,230 B1 * | 7/2001 | Haynor | ............... | A61B 5/062 |
| | | | | 128/899 |
| 6,841,994 B1 * | 1/2005 | Wiegert | ............... | G01V 3/15 |
| | | | | 324/244 |
| 7,932,718 B1 * | 4/2011 | Wiegert | ............... | G01V 3/081 |
| | | | | 324/245 |
| 2011/0285392 A1 | 11/2011 | Deng et al. | | |
| 2016/0029998 A1 * | 2/2016 | Brister | ............... | A61B 5/6853 |
| | | | | 600/424 |

* cited by examiner

METHOD FOR LOCATING AT LEAST ONE MOVABLE MAGNETIC OBJECT AND ASSOCIATED SYSTEM

CROSS-REFERENCE TO RELATED APPLICATIONS

This application is a National Stage of International patent application PCT/EP2015/078814, filed on Dec. 7, 2015, which claims priority to foreign French patent application No. FR 1462106, filed on Dec. 9, 2014, the disclosures of which are incorporated by reference in their entirety.

FIELD OF THE INVENTION

The present invention relates to a method for locating at least one movable magnetic object, and to an associated system.

BACKGROUND

Documents relating to methods and devices for locating a magnetic object, such as document FR 2 988 862, are known.

Document FR 2 988 862 discloses a method for locating a magnetic object from measurements taken by an array of tri-axial magnetometers, this array including N tri-axial magnetometers that are mechanically connected to one another with no degree of freedom in order to preserve a known distance between each of these magnetometers, N being an integer higher than five. The array of magnetometers is comprised in a device comprising a bearing surface for a writing medium such as one or more sheets, which are optionally joined.

The location of a magnetic object may be considered to be its position (its (x, y, z) coordinates in a coordinate system that is fixed with respect to the array of magnetometers) and the value of its magnetic moment ((Mx, My, Mz) in the same coordinate system), which is representative of the orientation of the magnetic object.

The introduction of a bias into the measurements used in this type of method makes the location imprecise, or even unstable.

In the context of a mobile use of such a locating device, i.e. when the user is able to move the locating device bearing its writing medium, its orientation may be modified, this leading directly to a rotation of the Earth's magnetic field in the coordinate system measured by the array of magnetometers, and therefore to a bias in the measurements of all the magnetometers.

Movement of the locating device in a uniform magnetic field therefore makes it almost impossible to use such a locating device.

When such a device is used in a system for digitizing handwritten text, in which type of system the precision with which it is sought to determine the location is better than 1 mm, only a slight variation in the Earth's magnetic field in the coordinate system of the magnetometers leads directly to a measurement deviation larger than the sought precision.

It is known from the prior art to eliminate, on turn-on, the measurement bias in all the sensors, or in the absence of any magnetic object.

Such a method does not allow movement during the location of a magnetic object and therefore does not solve the underlying problem mentioned with respect to a mobile use. In particular, in the context of a writing digitization application, it is frequently the case that the user will move the locating device in order to obtain a feasible writing angle while modifying his posture and moving.

It is also known to place a magnetometer at a sufficient distance from the movable magnetic object, so that this magnetometer is not affected by the magnetic field generated by the movable magnetic object. The sealed measured by this distant magnetometer serves to suppress the magnetic component induced by the Earth's field.

Such a method does not allow devices of small size to be used, and therefore does not lend itself well to a portable device. Furthermore, this method is very sensitive to errors in the measurements of this distant magnetometer and in particular to malfunction or to disruption of the latter by magnetic fields other than the Earth's.

SUMMARY OF THE INVENTION

One aim of the invention is to mitigate these problems.

According to one aspect of the invention a method is provided for locating at least one movable magnetic object with respect to an array of at least N triaxial magnetometers that are mechanically connected to one another with no degree of freedom in order to preserve a known relative position of these magnetometers, N being an integer at least equal to 2, comprising steps consisting in:

loading the measurements of the magnetometers, at a current time;

calculating a weighted average of said measurements of the magnetometers representing an average terrestrial magnetic field and an average magnetic field due to the movable magnetic object(s);

subtracting said weighted average of said measurements from each of said measurements in order to obtain modified measurements;

loading said modified measurements and a location of the one or more movable magnetic objects at the current time as input into a filtering operation for locating the one or more movable magnetic objects;

implementing the location filtering operation, this comprising steps consisting in:

calculating said weighted average of estimations of data delivered by said magnetometers;

subtracting said weighted average of said estimations from each of said estimated data; and delivering as output a location of the one or more movable magnetic objects at a subsequent time.

Such a method makes it possible to be able to use such a magnetic locating device while modifying the orientation of the device and/or while moving.

In addition, this method makes it possible to suppress the influence of a uniform field (the Earth's field being one example thereof) on the device and to eliminate sources of disruption that project a uniform magnetic field onto all of the magnetometers. Most sources may be likened to a magnetic dipole. If the distance between the device and the source of disruption is sufficiently large, the perceived magnetic field is a uniform magnetic field that is therefore corrected by the method.

Known sources of magnetic disruption may be DC motors, which generate strong magnetic fields that are for example stronger than 1 gauss. Thus, this method also allows the device to be used in a train or a tram.

By "locate" what is meant is determining the position and orientation of the movable magnetic object, for example by determining the position and magnetic moment of the magnetic object with a Cartesian representation (component along three orthogonal axes). As a variant, the position and orientation of the movable magnetic object may be determined by expressing the magnetic moment in a spherical coordinate system, i.e. in terms of a norm and two angles. This alternative may allow the magnetic moment of the movable magnetic object to be set and therefore only its position and two angles to be estimated by initializing the magnetic moment to a known value, the advantage seeing to decrease the number of unknowns to be estimated by the location filter.

In one embodiment, said weighted average uses weighting coefficients that are identical for each of the N magnetometers. This method has the advantage of requiring a lower computational power than required if different weights are used. Specifically, 3n multiplications (where N is the number of sensors) are made redundant.

According to one embodiment, said weighted average uses weighting coefficients that are lower for P magnetometers, among the N magnetometers, closest a respective movable magnetic object, P being an integer lower than N.

Thus, the influence of the P magnetometers that are the most affected, or that are even saturated, by the movable magnetic objects are ignored is limited.

For example, if there are a plurality of movable magnetic objects, the distances between the magnetometer and each movable magnetic object are determined for each magnetometer of the array, and then the determined distances are classed for all the magnetometers and movable magnetic objects in increasing order, and lower correlation coefficients are used for the P magnetometers the classed distances of which are the smallest.

For example, said weighted average uses zero weighting coefficients for said P magnetometers.

Thus, the P magnetometers that are the most affected, or that are even saturated, by the movable magnetic objects are ignored.

In one embodiment, said weighted average uses zero weighting coefficients except for the magnetometer, among the N magnetometers, furthest from the one or more movable magnetic objects.

Thus, the average of the measured terrestrial magnetic field is set equal to the magnetic field measured by the magnetometer furthest from the one or more movable magnetic objects, and therefore to the field that is least disrupted by the one or more movable magnetic objects.

According to another aspect of the invention, a system for locating at least one movable magnetic object is also provided, said system comprising:

an array of at least triaxial magnetometers that are mechanically connected to one another with no degree of freedom in order to preserve a known relative position of these magnetometers, N being an integer at least equal to 2;

an electronic processing unit suitable for determining the location of the one or more movable magnetic objects from measurements delivered by the magnetometers of the array and a location filter;

said electronic processing unit comprising:
means for loading measurements of the magnetometers, at a current time;
means for calculating a weighted average of said measurements of the magnetometers representing an average terrestrial magnetic field and an average magnetic field due to the movable magnetic object(s); and
means for subtracting said weighted average of said measurements from each of said measurements in order to obtain modified measurements;

the location filter comprising:
means for loading said modified measurements and a location of the one or more movable magnetic objects at the current time as input into a filtering operation for locating the movable magnetic object;
means for calculating a weighted average of estimations of data delivered by said magnetometers;
means for subtracting said weighted average of said estimations from each of said estimated data; and
means for delivering as output a location of the one or more movable magnetic objects at a subsequent time.

BRIEF DESCRIPTION OF THE DRAWINGS

The invention will be better understood on studying a few embodiments, which are described by way of completely nonlimiting example and illustrated by the appended drawings, in which.

In all of the figures, elements referenced with identical references are similar.

DETAILED DESCRIPTION

In the present description, features and functions that are well known to those skilled in the art are not described in detail.

Figure 1:
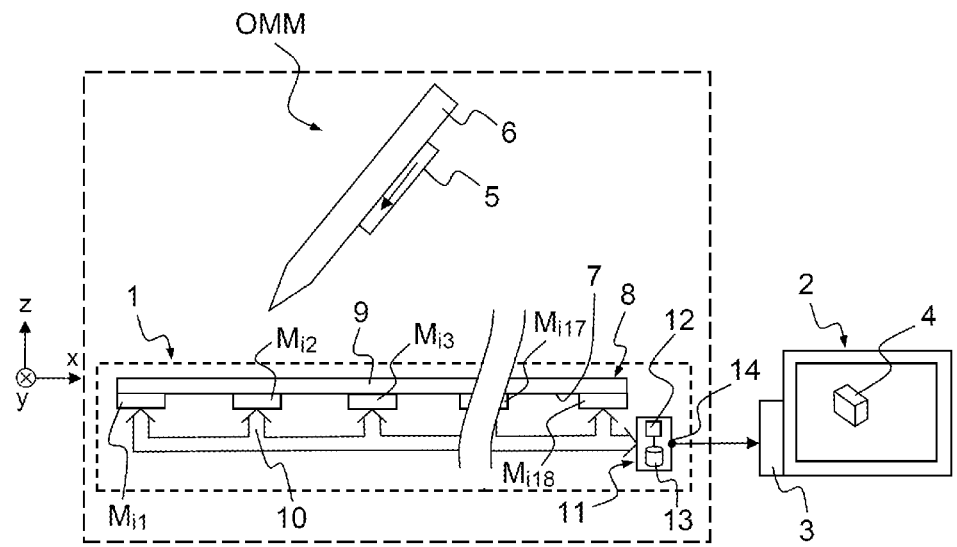
FIGS. 1 and 2 schematically illustrate a locating device according to the known prior art.

FIG. 1 shows a device 1 for locating a movable magnetic object OMM according to the prior art, as for example described in document FR 2988862 A1.

In the present case, the locating device 1 is used to control an electronic apparatus 2, for example a screen 2 connected to a control unit 3 capable of controlling the display of an image on this screen 2.

In the example shown, the unit 3 controls the position and orientation of a cursor 4 on the screen 2. For example, the cursor 4 has a three-dimensional shape such as a rectangular parallelepipedal shape.

A movable magnetic object $OMM_k$ comprises a permanent magnet 5 having a nonzero magnetic moment even in the absence of an exterior magnetic field and a non-magnetic utensil 6. By non-magnetic, what is meant is a utensil made from a material having no measurable magnetic property. For example, the utensil 6 is a pencil, a pen or an ink eraser made of wood or of plastic. The utensil 6 may be located from the location of the permanent magnet 5. The utensil 6 makes it easier to handle the permanent magnet 5, in particular when the latter is of small size. Typically, the combination of the permanent magnet 5 and the utensil 6 is freely movable directly by the hand of a human being in an orthogonal XYZ coordinate system that is fixed with no degree of freedom to the device 1. In the present case, the X and Y directions are horizontal (plane of the writing medium) and the Z direction is vertical. To this end, this combination weighs less than one kilo and, preferably, less than 200 g. The dimensions of this combination are sufficiently small for it to be picked up and moved by a single hand of a user. The one or more movable magnetic objects $OMM_k$ are freely movable in the orthogonal XYZ coordinate system.

For example, the coercive magnetic field of a magnet is higher than 100 A·m$^{-1}$ or 500 A·m$^{-1}$. For example, it is made of a ferro- or ferrimagnetic material. The permanent magnet 5 has an oblong shape. In FIG. 1, the direction of the magnetic moment of the permanent magnet 5 is shown by an arrow parallel to the longitudinal direction of this object. As a variant, the permanent magnet 5 may take the form of a ring encircling the utensil 6. The largest dimension of the permanent magnet 5 is denoted L below.

The power of the permanent magnet 5 is typically higher than 0.01 A·m$^2$ or 0.1 A·m$^2$. In this embodiment, the permanent magnet 5 is fastened with no degree of freedom to the utensil 6.

The locating device 1 allows the permanent magnet 5 to be located in the XYZ coordinate system. By locate, what is meant here is determining the x, y, z position of the permanent magnet 5 in the XYZ coordinate system and also determining the orientation of the permanent magnet 5 with respect to the X, Y and Z axes of the XYZ coordinate system. For example, the orientation of the permanent magnet 5 may be represented by the Cartesian coordinates $M_x$, $M_y$ and $M_z$ of the magnetic moment of the permanent magnet 5 in the XYZ coordinate system, or by the spherical coordinates M, θ, φ of the magnetic moment of the permanent magnet 5 in the XYZ coordinate system, respectively, with respect to the X, Y and Z axes of the coordinate system.

The locating device 1 includes an array of N triaxial magnetometers $M_{ij}$. In FIG. 1, the wavy vertical lines indicate that some of the locating device 1 has not been shown.

Typically, N may be higher than five and, preferably, higher than sixteen or thirty-two, or even equal to sixty-four.

In this embodiment, the magnetometers $M_{ij}$ are aligned into rows and columns to form a matrix array or simply an array. In the present case, this matrix array includes eight rows and eight columns. The indices i and j respectively identify the row and column of this matrix array at the intersection of which the magnetometer $M_{ij}$ is found.

In FIG. 1, only the magnetometers $M_{i1}$, $M_{i2}$, $M_{i3}$, $M_{i4}$ and $M_{i8}$ of one row i may be seen. The position of the magnetometers $M_{ij}$ with respect to one another is illustrated in more detail in FIG. 2.

Each magnetometer $M_{ij}$ is joined with no degree of freedom to the other magnetometers. To this end, the magnetometers $M_{ij}$ are fastened with no degree of freedom to a back face 7 of a rigid panel 8. This rigid panel 8 has a front face 9 that is turned toward the permanent magnet 5. The panel 8 is made from a stiff non-magnetic material. For example, the panel 8 may be made of glass.

Each magnetometer $M_{ij}$ measures the direction and strength of the magnetic field generated by the permanent magnet 5. To do this, each magnetometer $M_{ij}$ measures the norm of the orthogonal projection of the magnetic field generated by the permanent magnet 5 in this magnetometer $M_{ij}$ along three measurement axes of this magnetometer. In the present case, these three measurement axes are orthogonal to one another. For example, the measurement axes of each of the magnetometers $M_{ij}$ are parallel to the X, Y and Z axes of the coordinate system, respectively.

Each magnetometer $M_{ij}$ is connected by way of a data bus 10 to a processing unit 11.

The processing unit 11 is capable of determining the position and orientation of the permanent magnet 5 in the XYZ coordinate system from measurements of the magnetometers $M_{ij}$. To this end, the unit 11 includes a programmable electronic processor 12 that is able to execute instructions stored in a data storage medium. The unit 11 therefore also comprises a memory 13 containing the instructions required for the execution by the processor 12 of the method of FIG. 3.

In particular, the unit 11 implements a physico-mathematical model associating measurements of a plurality of magnetometers $M_{ij}$ with parameters representative of the position and orientation of the permanent magnet 5, i.e. also of the utensil 6, in the XYZ coordinate system.

This model is implemented in the form of a non-linear estimation filter, an extended Kalman filter for example.

This model is typically constructed from magnetostatic physical equations. To construct this model, the permanent magnet 5 is approximated by a magnetic dipole. This approximation introduces only very few errors if the distance between the permanent magnet 5 and the magnetometer $M_{ij}$ is larger than 2 L and, preferably, larger than 8 L; L being the largest dimension of the permanent magnet 5. Typically, L is smaller than 20 cm and preferably, smaller than 10 or 5 cm.

The unit 11 is also capable of passing the position and measured orientation of the permanent magnet 5 to an interface 14.

The control unit 3 is connected to the unit 11 via this interface 14.

Figure 2:
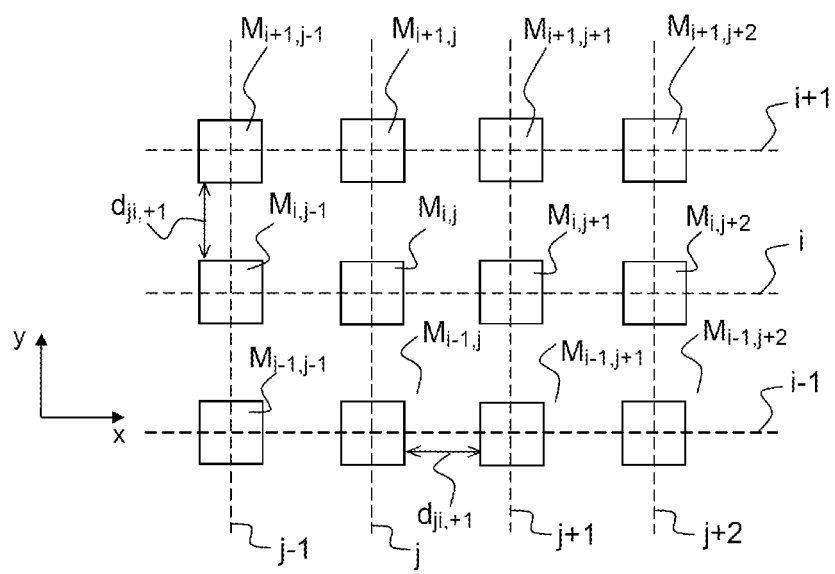

FIG. 2 shows some of the magnetometers $M_{ij}$ of the locating device 1. These magnetometers $M_{ij}$ are aligned into rows i parallel to the X direction. These magnetometers are also aligned in columns j parallel to the Y direction in order to form a matrix array or simply an array. The rows i and columns j are arranged in order of increasing indices.

The center of the magnetometer $M_{ij}$ is located at the intersection of the row i and the column j. The center of the magnetometer corresponds to the point at which the magnetic field is measured by this magnetometer. In the present case, the indices i and j belong to the interval [1; 8].

The centers of two magnetometers $M_{ij}$ and $M_{1,j+1}$ that are immediately consecutive along a row i are separated by a known distance $d_{i,j,j+1}$. Similarly, the center of two magnetometers $M_{ij}$ and $M_{i+1,j}$ that are immediately consecutive along a given column j are separated by a known distance $d_{j,i,i+1}$.

In the particular case presently described, whatever the row i, the distance $d_{i,j,j+1}$ is the same. This distance is therefore denoted $d_j$. Similarly, whatever the column j, the distance $d_{j,i,i+1}$ between two magnetometers is the same. This distance is therefore denoted $d_i$. In the described example, the distances $d_i$ and $d_j$ are both equal to d.

Typically, the distance d is comprised between 1 and 4 cm when 1
  the power of the permanent magnet is 0.5 A·m$^2$;
  the sensitivity of the magnetometers is $4\times10^{-7}$ T; and
  the number of magnetometers $M_{ij}$ is sixty-four.

Figure 3:
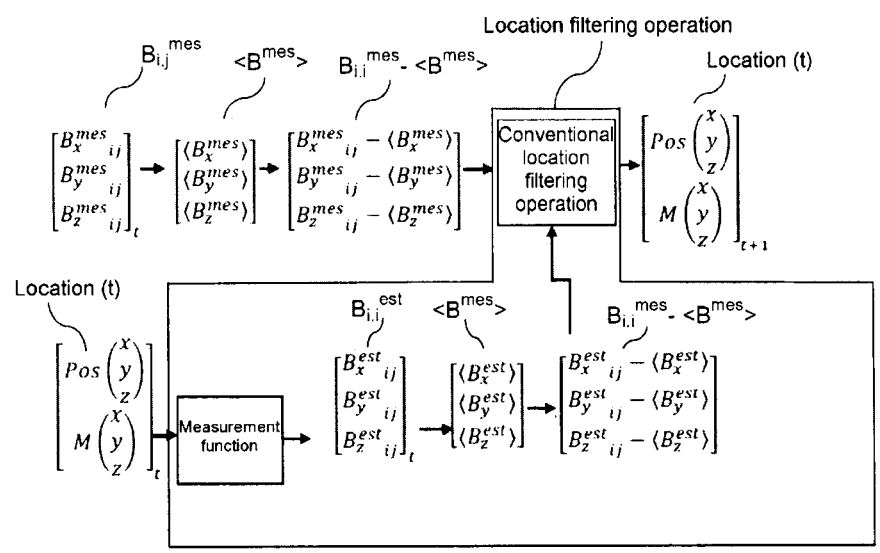
FIG. 3 schematically illustrates a method according to one aspect of the invention.

FIG. 3 illustrates one embodiment of a method according to one aspect of the invention. The steps of the method are implemented by means of the electronic processing unit 11.

In each measuring step, a weighted average $<B^{mes}>$ of said measurements $B_{i,j}^{mes}$ of respective magnetometers $M_{i,j}$ representing the sum of an average terrestrial magnetic field and an average magnetic field due to the movable magnetic object(s) $OMM_k$ is calculated.

The weighted average $<B^{mes}>$ may, nonlimitingly, be the arithmetic mean in which case the weighting coefficients are all equal.

Thus, the Earth's magnetic field is eliminated at the same time as the average magnetic field generated by the one or more movable magnetic objects $OMM_k$.

The suppression of the Earth's magnetic field or uniform magnetic disruptions on the system constitutes the sought correction whereas the suppression of the average of the magnetic field generated by the ferromagnetic mass constitutes an introduced error.

Next, the introduced error is accounted for in order not to degrade the precision of the location algorithm.

Therefore the weighted average $$<B^{mes}> = \begin{bmatrix} \langle B_x^{mes} \rangle \\ \langle B_y^{mes} \rangle \\ \langle B_z^{mes} \rangle \end{bmatrix}$$

of the measurements $$B_{i,j}^{mes} = \begin{bmatrix} B_{x_{ij}}^{mes} \\ B_{y_{ij}}^{mes} \\ B_{z_{ij}}^{mes} \end{bmatrix}_t$$

of the magnetometers $M_{ij}$ representing an average terrestrial magnetic field and an average magnetic field due to the movable magnetic object(s) $OMM_k$ is calculated.

Next, the weighted average $$<B^{mes}> = \begin{bmatrix} \langle B_x^{mes} \rangle \\ \langle B_y^{mes} \rangle \\ \langle B_z^{mes} \rangle \end{bmatrix}$$

of the measurements $B_{i,j}^{mes}$ is subtracted from each of the measurements $$B_{i,j}^{mes} = \begin{bmatrix} B_{x_{ij}}^{mes} \\ B_{y_{ij}}^{mes} \\ B_{z_{ij}}^{mes} \end{bmatrix}_t$$

to obtain modified measurements $$B_{i,j}^{mes} - <B^{mes}> = \begin{bmatrix} B_{x_{ij}}^{mes} - \langle B_x^{mes} \rangle \\ B_{y_{ij}}^{mes} - \langle B_y^{mes} \rangle \\ B_{z_{ij}}^{mes} - \langle B_z^{mes} \rangle \end{bmatrix}.$$

For example, in the case where the weighted average is the arithmetic mean:

$$\begin{bmatrix} \langle B_x^{mes} \rangle \\ \langle B_y^{mes} \rangle \\ \langle B_z^{mes} \rangle \end{bmatrix} = \frac{1}{N} \sum_{i=1}^{a} \sum_{j=1}^{b} \begin{bmatrix} B_{x_{ij}}^{mes} \\ B_{y_{ij}}^{mes} \\ B_{z_{ij}}^{mes} \end{bmatrix} \text{ where } a \times b = N$$

A location filtering operation (FL) then uses as input the modified measurements $$B_{i,j}^{mes} - <B^{mes}> = \begin{bmatrix} B_{x_{ij}}^{mes} - \langle B_x^{mes} \rangle \\ B_{y_{ij}}^{mes} - \langle B_y^{mes} \rangle \\ B_{z_{ij}}^{mes} - \langle B_z^{mes} \rangle \end{bmatrix}$$

and a location $$(Pos_t, M_t) = \begin{bmatrix} Pos\begin{pmatrix} x \\ y \\ z \end{pmatrix} \\ M\begin{pmatrix} x \\ y \\ z \end{pmatrix} \end{bmatrix}_{t+1}$$

of the one or more movable magnetic objects $(OMM_k)$ at the current time t.

The location filtering operation uses a calculation of an estimated weighted average $$<B^{est}> = \begin{bmatrix} \langle B_x^{est} \rangle \\ \langle B_y^{est} \rangle \\ \langle B_z^{est} \rangle \end{bmatrix}$$

of estimations $$B_{i,j}^{est} = \begin{bmatrix} B_{x_{ij}}^{est} \\ B_{y_{ij}}^{est} \\ B_{z_{ij}}^{est} \end{bmatrix}_t$$

of data delivered by said magnetometers ($M_{ij}$). In the present case, the weighted average used must be identical to that used for the measured weighted average (i.e. same weighting coefficients respectively associated with the magnetometers in the weighting of the measurements and in the weighting of the estimations, one weighting coefficient being associated with each magnetometer).

The estimation algorithms are based on the use of a measurement model that relates position, orientation and the magnetic moment of the magnet with the magnetic field generated at every point in space.

The calculation of the estimated weighted average, in this embodiment, uses the same weighted average, in the present case the arithmetic mean:

$$\begin{bmatrix} \langle B_x^{est} \rangle \\ \langle B_y^{est} \rangle \\ \langle B_z^{est} \rangle \end{bmatrix} = \frac{1}{N} \sum_{i=1}^{a} \sum_{j=1}^{b} \begin{bmatrix} B_{x_{ij}}^{est} \\ B_{y_{ij}}^{est} \\ B_{z_{ij}}^{est} \end{bmatrix} \text{ where } a \times b = N$$

Next, said weighted average $$<B^{est}> = \begin{bmatrix} \langle B_x^{est} \rangle \\ \langle B_y^{est} \rangle \\ \langle B_z^{est} \rangle \end{bmatrix}$$

is subtracted from each of said estimated data $B_{i,j}^{est}$.

The location filter FL then delivers as output a location $$(Pos_{t+1}, M_{t+1}) = \begin{bmatrix} Pos\begin{pmatrix} x \\ y \\ z \end{pmatrix} \\ M\begin{pmatrix} x \\ y \\ z \end{pmatrix} \end{bmatrix}_{t+1}$$

of the one or more movable magnetic objects $OMM_k$ at a subsequent time t+1.

As a variant, said weighted average uses lower weighting coefficients for P magnetometers, among the N magnetometers $M_{i,j}$, closest a respective movable magnetic object $OMM_k$, P being an integer lower than N. Of course, the weighted average of the measurements is still identical to the weighted average of the estimations.

Thus, the influence of the P magnetometers that are the most affected, or that are even saturated, by the movable magnetic objects are ignored is limited.

The weighted average may even use zero weighting coefficients for said P magnetometers, so as to completely eliminate the influence of the P magnetometers that are most affected, or that are even saturated, by the movable magnetic objects are ignored.

As a variant, the weighted average may use zero weighting coefficients except for the magnetometer, among the N magnetometers, the furthest from the one or more movable magnetic objects, in order to set the average of the Earth's magnetic field equal to the measurement of the magnetometer the least affected by the one or more movable magnetic objects.

In this embodiment, the calculated average corresponds exactly to the measurement of the magnetometer.

The steps of the method described above may be performed by one or more programmable processors executing a computer program in order to execute the functions of the invention by operating on input data and generating output data.

A computer program may be written in any form of programming language, including compiled or interpreted languages, and the computer program may be deployed in any form, including as a standalone program or as a subprogram, element or other unit suitable for use in a computer environment. A computer program may be deployed so as to be executed on one computer, or on multiple computers on one site or distributed across multiple sites and connected to one another by a communication network.

The preferred embodiment of the present invention has been described. Various modifications may be made without deviating from the spirit and scope of the invention. Therefore, other embodiments fall within the scope of the following claims.

The invention claimed is:

1. A method for locating at least one movable magnetic object with respect to an array of at least N triaxial magnetometers that are mechanically connected to one another with no degree of freedom in order to preserve a known relative position of these magnetometers, N being an integer at least equal to 2, comprising steps consisting in:
    loading the measurements of the magnetometers, at a current time;
    calculating a weighted average of said measurements of the magnetometers representing an average terrestrial magnetic field and an average magnetic field due to the movable magnetic object(s);
    subtracting said weighted average from each of said measurements in order to obtain modified measurements;
    loading said modified measurements and a location of the one or more movable magnetic objects at the current time as input into a filtering operation for locating the one or more movable magnetic objects;
    implementing the location filtering operation, this comprising steps consisting in:
        calculating a weighted average of estimations of data delivered by said magnetometers;
        subtracting said weighted average from each of said estimated data; and
        delivering as output a location of the one or more movable magnetic objects at a subsequent time.

2. The method as claimed in claim 1, wherein said weighted average uses weighting coefficients that are identical for each of the N magnetometers.

3. The method as claimed in claim 1, wherein said weighted average uses weighting coefficients that are lower for P magnetometers, among the N magnetometers, closest the one or more movable magnetic objects, P being an integer lower than N.

4. The method as claimed in claim 3, wherein said weighted average uses zero weighting coefficients for said P magnetometers.

5. The method as claimed in claim 1, wherein said weighted average uses zero weighting coefficients except for the magnetometer, among the N magnetometers, furthest from the one or more movable magnetic objects.

6. A system for locating at least one movable magnetic object comprising:
    an array of at least N triaxial magnetometers that are mechanically connected to one another with no degree of freedom in order to preserve a known relative position of these magnetometers, N being an integer at least equal to 2;
    an electronic processing unit suitable for determining the location of the one or more movable magnetic objects from measurements delivered by the magnetometers of the array and a location filter;
    said electronic processing unit comprising:
        means for loading measurements of the magnetometers, at a current time;
        means for calculating a weighted average of said measurements of the magnetometers representing an average terrestrial magnetic field and an average magnetic field due to the movable magnetic object(s); and
        means for subtracting said weighted average from each of said measurements in order to obtain modified measurements;

the location filter FL) comprising:
- means for loading said modified measurements and a location of the one or more movable magnetic objects at the current time as input into a filtering operation for locating the movable magnetic object;
- means for calculating a weighted average of estimations of data delivered by said magnetometers;
- means for subtracting said weighted average from each of said estimated data; and
- means for delivering as output a location of the one or more movable magnetic objects at a subsequent time.

* * * * *

UNITED STATES PATENT AND TRADEMARK OFFICE
CERTIFICATE OF CORRECTION

PATENT NO. : 10,095,325 B2
APPLICATION NO. : 15/534813
DATED : October 9, 2018
INVENTOR(S) : Tristan Hautson et al.

Page 1 of 1

It is certified that error appears in the above-identified patent and that said Letters Patent is hereby corrected as shown below:

In the Claims

In Claim 6, Column 11, Line 1, "the location filter FL) comprising:" should be -- the location filter comprising: --.

Signed and Sealed this
Eleventh Day of December, 2018

Andrei Iancu
*Director of the United States Patent and Trademark Office*